United States Patent
Takeda et al.

(10) Patent No.: US 9,005,435 B2
(45) Date of Patent: Apr. 14, 2015

(54) STRUCTURE FOR OPENING SECTION, AND WATER PURIFICATION CARTRIDGE

(75) Inventors: Hatsumi Takeda, Toyohashi (JP); Atsushi Hatakeyama, Tokyo (JP)

(73) Assignee: Mitsubishi Rayon Cleansui Company, Limited, Tokyo (JP)

( * ) Notice: Subject to any disclaimer, the term of this patent is extended or adjusted under 35 U.S.C. 154(b) by 256 days.

(21) Appl. No.: 13/814,603

(22) PCT Filed: Aug. 12, 2011

(86) PCT No.: PCT/JP2011/068433
§ 371 (c)(1),
(2), (4) Date: Apr. 10, 2013

(87) PCT Pub. No.: WO2012/020838
PCT Pub. Date: Feb. 16, 2012

(65) Prior Publication Data
US 2014/0138303 A1    May 22, 2014

(30) Foreign Application Priority Data
Aug. 12, 2010   (JP) ................. 2010-180726

(51) Int. Cl.
| | |
|---|---|
| *B01D 35/02* | (2006.01) |
| *C02F 1/00* | (2006.01) |
| *C02F 1/44* | (2006.01) |
| *C02F 1/28* | (2006.01) |

(52) U.S. Cl.
CPC ............. *B01D 35/02* (2013.01); *C02F 1/003* (2013.01); *C02F 1/44* (2013.01); *C02F 2201/006* (2013.01); *C02F 2307/10* (2013.01); *C02F 1/281* (2013.01); *C02F 1/283* (2013.01)

(58) Field of Classification Search
CPC ............. C02F 1/003; C02F 1/44; C02F 1/281; C02F 1/283; C02F 2201/006; C02F 2307/10; B01D 23/14; B01D 27/02; B01D 29/0035; B01D 29/15; B01D 35/02
USPC .............. 210/172.1, 175, 282, 289, 291, 482, 210/495, 497.01, 491
See application file for complete search history.

(56) References Cited

U.S. PATENT DOCUMENTS

| | | |
|---|---|---|
| 6,841,067 B1 | 1/2005 | Hofmann et al. |
| 2009/0014366 A1 | 1/2009 | Takeda et al. |

FOREIGN PATENT DOCUMENTS

| | | | |
|---|---|---|---|
| JP | 59039317 A | * 3/1984 | ................... 210/499 |
| JP | 02-008510 U | 1/1990 | |
| JP | 2001-502596 A | 2/2001 | |

(Continued)

OTHER PUBLICATIONS

Russian Office Action, Decision on Grant, dated Aug. 29, 2014 for Russian application No. 2013110314.

(Continued)

*Primary Examiner* — Matthew O Savage
(74) *Attorney, Agent, or Firm* — Morgan, Lewis & Bockius LLP (57) ABSTRACT

A structure for an opening section closed by a net through which fluid flows. The opening section is provided in a vertical wall so as to rise to the vertical wall side from the corner formed between the vertical wall and a horizontal wall. A downward protruding rib is provided on the lower side of the opening section. The lower edge of the net is provided so as to be affixed to at least the rib.

7 Claims, 6 Drawing Sheets

(56) References Cited

FOREIGN PATENT DOCUMENTS

| | | |
|---|---|---|
| JP | 2003-514647 A | 4/2003 |
| JP | 2004-230335 A | 8/2004 |
| RU | 2 335 327 C2 | 10/2008 |
| RU | 2 340 386 C2 | 12/2008 |
| RU | 2 353 419 C2 | 4/2009 |
| RU | 2 383 382 C2 | 3/2010 |
| WO | 98/17582 A1 | 4/1998 |
| WO | 2007/094364 A1 | 8/2007 |

OTHER PUBLICATIONS

International Search Report dated Nov. 15, 2011, for International Application No. PCT/JP2011/068433.

* cited by examiner

STRUCTURE FOR OPENING SECTION, AND WATER PURIFICATION CARTRIDGE

TECHNICAL FIELD

The present invention relates to a structure for an opening section through which fluid flows, and a water purifier cartridge which includes the structure for the opening section.

Priority is claimed on Japanese Patent Application No. 2010-180726, filed Aug. 12, 2010, the content of which is incorporated herein by reference.

BACKGROUND ART

Conventionally, an opening section that allows a fluid to flow into a container or the like by a self-weight is formed in a vertical wall in terms of satisfactorily releasing air, and is partitioned by a reticular texture such as a net with fine meshes so as to prevent any other things than the fluid, such as dust, from entering the opening section (for example, see PATENT LITERATURE 1).

Furthermore, a structure has been known in which a horizontal wall is connected directly under the opening section which is formed on the vertical wall and is partitioned by the reticular texture (for example, see PATENT LITERATURE 2).

DOCUMENTS OF RELATED ART

Patent Literature

[PATENT LITERATURE 1] Japanese Unexamined Patent Application, First Publication No. 2001-502596
[PATENT LITERATURE 2] Japanese Unexamined Patent Application, First Publication No. 2003-514647

SUMMARY OF INVENTION

Problems to be Solved by the Invention

However, in the conventional structure for the opening section, a fixture of a predetermined width for fixing the reticular texture to a periphery of the opening section is provided so as to attach the reticular texture to the opening section. In this manner, when forming the fixture of the predetermined width, there is a concern that the fixture of a lower edge becomes a dam. Moreover, particularly, when the horizontal wall is connected directly under the opening section, the fluid is likely to be retained in the corner section formed between the vertical wall and the horizontal wall. Furthermore, when trying to fix the reticular texture along a wall surface that is curved by excluding the fixture below the opening section, a worker with experienced skills is required, and there is a problem in that various may occur in the attachment performance of the reticular texture.

The present invention takes the above circumstances into consideration, with an object of providing a structure for an opening section capable of stably fixing a reticular texture, while preventing a fluid from being retained at a lower edge of the opening section, a water purification cartridge including the structure for the opening section, and a water server including the water purification cartridge.

Means for Solving the Problem

In order to solve the above-mentioned problems, according to a first aspect of the present invention, there is provided a structure for an opening section (for example, an opening section 56 in an embodiment) partitioned by a reticular texture (for example, a net 57 in an embodiment) through which fluid flows, wherein the opening section is provided in a vertical wall so as to rise from a corner section to a vertical wall side (for example, a corner section 55 in the embodiment) formed between a vertical wall (for example, the vertical wall 50 in the embodiment) and a horizontal wall (for example, a horizontal wall 51 in the embodiment), and a downward protruding rib (for example, a rib 60 in the embodiment) is provided on a lower side of the opening section, and the lower edge of the reticular texture is fixed to at least the rib.

According to a second aspect of the invention, in the first aspect of the present invention, the vertical wall may be formed in a cylindrical shape, and the rib may be formed in a ring shape.

According to a third aspect of the invention, in the first or second aspect of the present invention, the rib may be placed directly below the vertical wall.

According to a fourth aspect of the invention, the rib may be placed so as to be offset with respect to the vertical wall.

According to a fifth aspect of the invention, there is provided a water purification cartridge (for example, a water purification cartridge 10 in the embodiment) including the structure for the opening section described in any one of the first to fourth aspects of the present invention, wherein the water purification cartage includes an external lid body (an external lid body 22 in the embodiment) having a raw water inlet (for example, a raw water inlet pipe section 62 in the embodiment) configured to introduce raw water, and an internal lid body (for example, an internal lid body 24 in the embodiment) placed inside the external lid body and having the structure for the opening section.

Effects of the Invention

According to the first aspect, the rib is provided below the opening section so as to protrude downward, and the lower edge of the reticular texture partitioning the opening section is fixed to the rib. Thus, for example, as in the case where the rib fixing the lower edge of the reticular texture is provided above the horizontal wall, the rib does not become a dam when raw water flows in the opening section along an extension direction of the horizontal wall. Accordingly, there is an effect that it is possible to prevent the fluid from being retained in the corner section between the vertical wall and the horizontal wall, while stably fixing the reticular texture in the state along the opening section without being bent, thereby allowing the fluid to smoothly flow.

According to the second aspect, even when partitioning the opening section formed in the vertical wall formed in a cylindrical shape by the reticular texture, the rib is formed in a ring shape, and thus the rib can be placed and reliably fixed over the entire position of the lower portion of the vertical wall. Accordingly, there is an effect that it is possible to promote the improvement of reliability.

According to the third aspect, the rib is placed directly below the vertical wall, and thus, there is no need to bend the reticular texture in any case of when providing the reticular texture by performing insert-molding of the periphery of the reticular texture in the vertical wall of the periphery of the opening section and the rib; and when forming the vertical wall of the periphery of the opening section and the rib, and then adhering the reticular texture to provide the reticular texture. Thus, there is an effect that the attachment work becomes easy.

According to the fourth aspect, since the rib is placed so as to be offset to the vertical wall, there is an effect that it is possible to improve strength of the horizontal wall near the corner section using the rib for fixing the reticular texture.

According to the fifth aspect, the raw water allowed to flow from the upper opening section of the external lid body flows down between the external lid body and the internal lid body, collides with the horizontal wall of the internal lid body, and flows into the cartridge through the opening section formed in the vertical wall, particularly, in the case of a water purification cartridge configured to purify the raw water by self-weight, it is possible to prevent the raw water from being retained between the external lid body and the internal lid body, and thus there is an effect that it is possible to smoothly perform the inflow of the raw water to the water purification cartridge.

According to the sixth aspect, since the water purification cartridge described in the fifth aspect is included in the main body container of the water server, there is an effect that it is possible to facilitate the inflow of the raw water into the water server.

DESCRIPTION OF EMBODIMENTS

Next, an example of a case of applying a structure for an opening section according to an embodiment of the present invention to a water purification cartridge will be described referring to the drawings.

Figure 1:
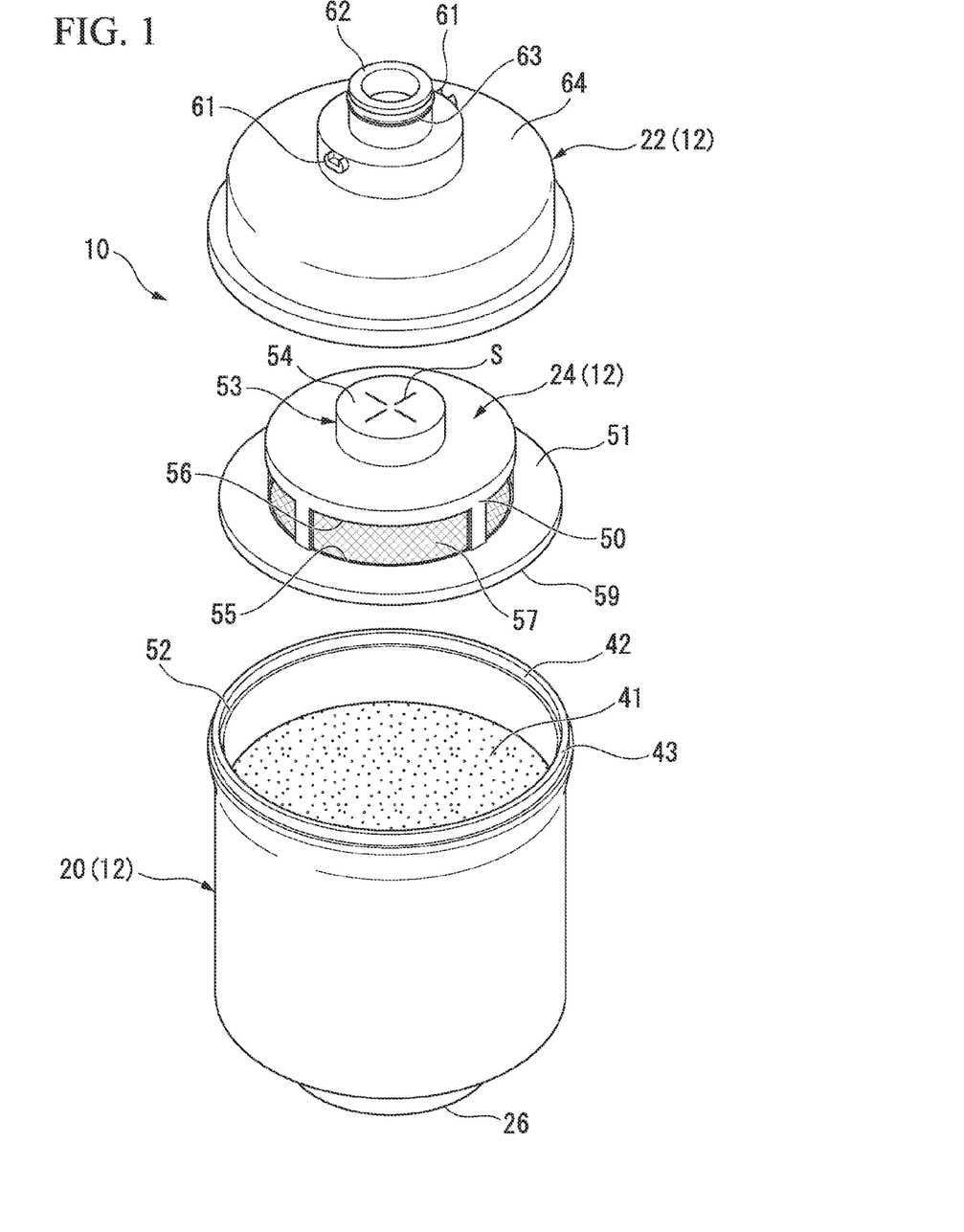
FIG. 1 is an exploded perspective view of a water purification cartridge according to an embodiment of the present invention.
Figure 2:
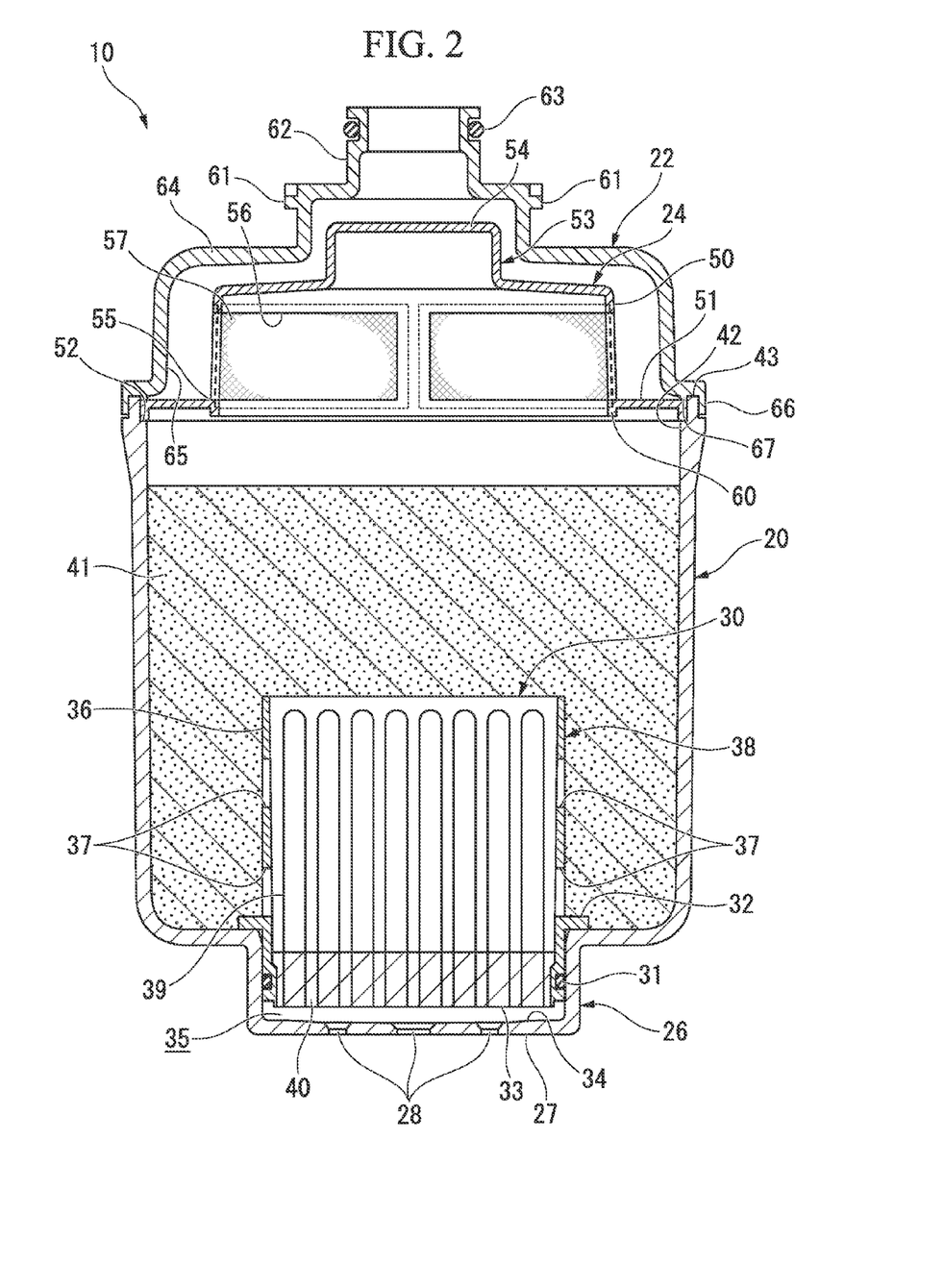
FIG. 2 is a longitudinal cross-sectional view of the water purification cartridge according to an embodiment of the present invention.

As shown in FIGS. 1 and 2, a housing 12 of a water purification cartridge 10 includes a substantially cylindrical storing section 20 with a bottom, an internal lid body 24 configured to close the storing section 20, and an external lid body 22 configured to cover the internal lid body 24.

The storing section 20 is provided with a small-diameter section 26 molded to have a step with a shape protruding downward, and a plurality of discharge ports 28 configured to discharge purified water is formed on a bottom wall 27 of the small-diameter section 26. A substantially columnar membrane filtering unit 30 having the same outer diameter as the inner diameter of the small-diameter section 26 is detachably fixed to the small-diameter section 26. An O-ring 31 is mounted on a lower outer periphery of the membrane filtering unit 30, and a raw water side and a purified water side on the outside of the membrane filtering unit 30 are separated from each other by the O-ring 31. Furthermore, on the upper periphery of the membrane filtering unit 30 above the O ring 31, a flange 32 extending in the radial direction is formed, and the downward displacement of the membrane filtering unit 30 is restricted by the flange 32 so as to secure a predetermined gap 35 between the lower surface 33 of the membrane filtering unit 30 and the bottom surface 34 of the small-diameter section 26.

The membrane filtering unit 30 accommodates a plurality of hollow fiber membranes 39 in a substantially cylindrical casing 38 in which an upper portion is opened and which has a plurality of pores 37 in the side wall 36, wherein the hollow fiber membranes 39 are disposed such that both end portions thereof face downward and are separated to a primary side and a secondary side by a potting section 40 while maintaining the openings of the end portions.

The hollow fiber membrane 39 is a porous membrane, and as materials thereof, polyethylene, polypropylene, poly (4-methyl pentene-1), tetrafluoroethylene, polyvinylidene fluoride, polystyrene, polysulfone, polyether sulfone, polyether ketone, polyether ether ketone or the like can be used.

Furthermore, as the potting section 40, a thermosetting resin such as an epoxy resin, an urethane resin, a silicone resin, an unsaturated polyester resin or the like can be used.

The storing section 20 is filled with an absorbent material 41 up to a predetermined height in a state where the membrane filtering unit 30 is fitted to the small-diameter section 26 via the O-ring 31. As the absorbent material 41, a powdered or granular absorbent material (activated carbon, zeolite, molecular sieve or the like), a fibrous absorbent material (fibrous activated carbon) or the like can be used.

The internal lid body 24 is formed in a substantially hat shape which is convex upward, and includes a substantially cylindrical vertical wall 50 extending in a substantially vertical direction, and a ring-shaped horizontal wall 51 that substantially horizontally extends outward in the radial direction from the whole periphery of the lower edge of the vertical wall 50. The internal lid body 24 is configured so that the outer periphery of the horizontal wall 51 is supported by a step section 52 of the inner peripheral side of the upper opening section 42 of the storing section 20 and is fixed by ultrasonic welding or the like. Furthermore, a convex section 53 having a diameter smaller than the lower portion of the internal lid body 24 is provided on the upper portion of the internal lid body 24, and a plurality of air-releasing slits S is radially formed on the upper wall 54 of the convex section 53.

Furthermore, the vertical wall 50 of the internal lid body 24 is formed with an opening section 56 that stands up from the corner section 55 between the vertical wall 50 and the horizontal wall 51 to the vertical wall 50 side. The opening section 56 allows the raw water to flow into the storing section 20, and is partitioned by a net (reticular texture) 57 that prevents foreign matters such as dust from entering while allowing the raw water to flow therein.

Figure 3:
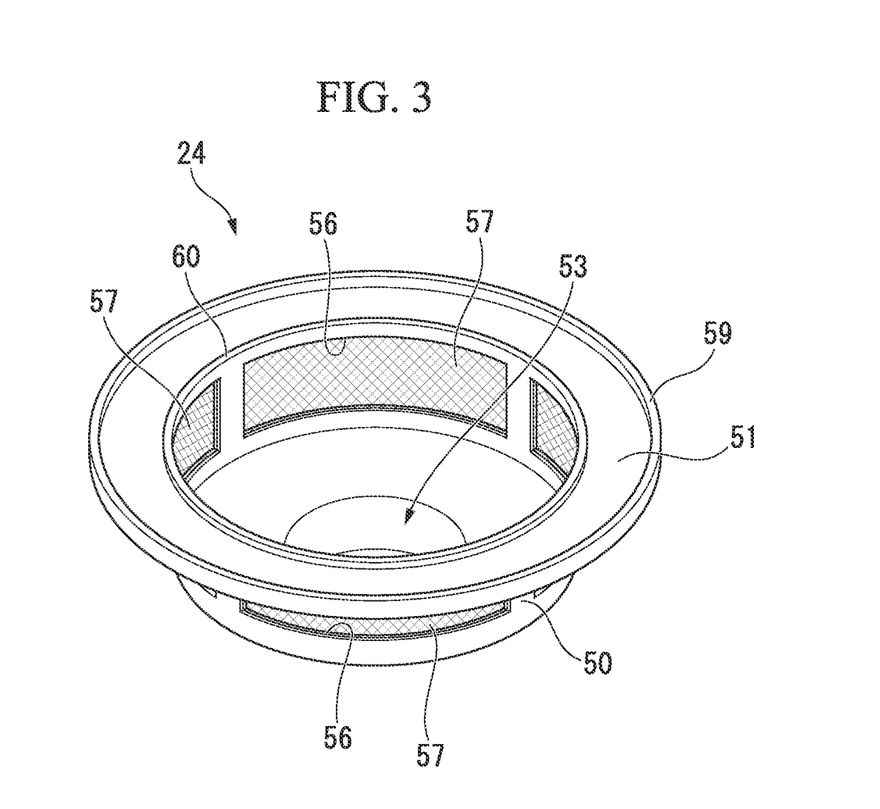
FIG. 3 is a perspective view as viewed from a back side surface of an internal lid body of the water purification cartridge according to an embodiment of the present invention.

As shown in FIGS. 2 and 3, a ring-shaped rib 60 protruding downward along the vertical wall 50 is formed below the opening section 56, i.e., the back side of the internal lid body 24. The rib 60 has a function as a fixture for fixing the lower edge of the net 57, and has a sufficient height dimension as the fixture. Furthermore, on the outer periphery of the horizontal wall 51 of the internal lid body 24, an outer peripheral rib 59 protruding downward and welded to the above-mentioned step section 52 is formed.

Moreover, the net 57 is fixed to the vertical wall 50 on the periphery of the opening section 56 and the ring-shaped rib 60 by insert molding when performing the resin molding of the internal lid body 24. In FIG. 1, an example of providing four opening sections 56 is shown. However, the number of the opening section 56 may be appropriately selected, depending on the strength or the like of the internal lid body 24.

Figure 5:
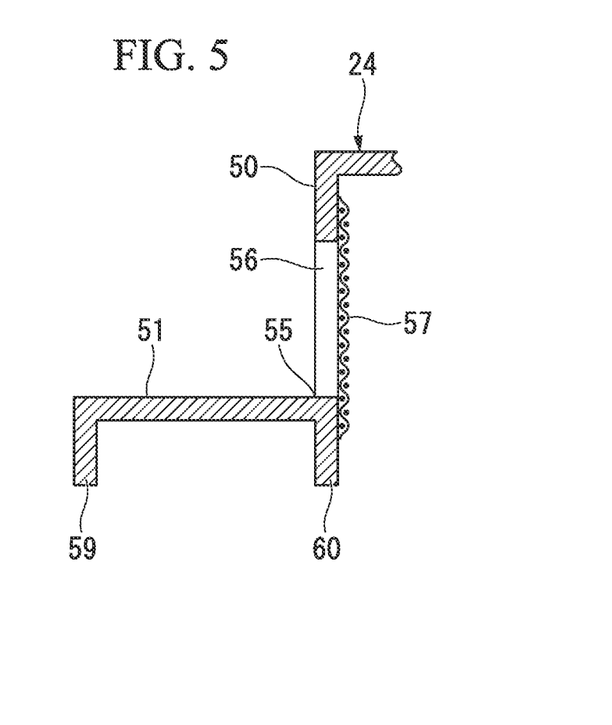
FIG. 5 is a longitudinal cross-sectional view of a horizontal wall, a vertical wall, a reticular texture, and a rib in the case where the reticular texture according to an embodiment of the present invention is externally fixed
Figure 6:
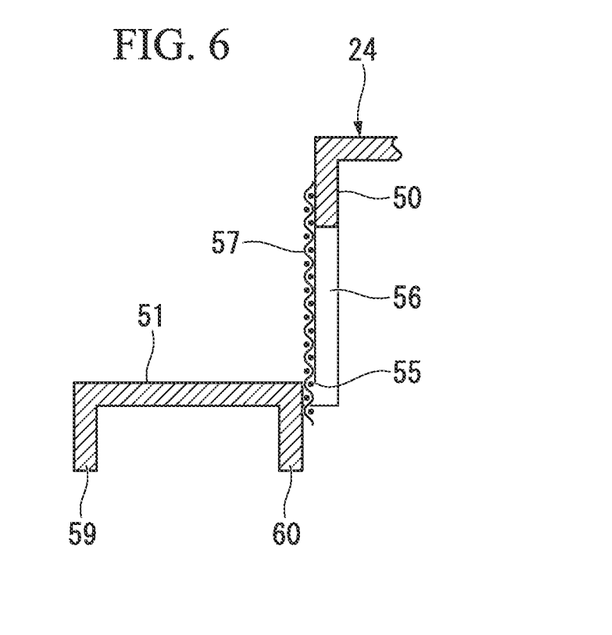
FIG. 6 is longitudinal cross-sectional view of a horizontal wall, a vertical wall, a reticular texture, and a rib in the case where the reticular texture according to an embodiment of the present invention is internally fixed.

Furthermore, the method of fixing the net 57 to the rib 60 is not limited to insert molding. After molding the internal lid body 24, the net 57 may be adhered and fixed using an adhesive or the like. With respect to fixing of the net 57, for example, as shown in FIG. 5, an internal fixing in which the periphery of the net 57 is adhered to the inner peripheral surface of the vertical wall 50 and the inner peripheral surface of the rib 60 can be conducted, or as shown in FIG. 6, an external fixing in which the periphery of the net 57 is adhered to the outer peripheral surface of the vertical wall 50 and the inner peripheral surface of the rib 60 can be conducted.

The external lid body 22 is formed in a convex shape in the same manner as the internal lid body 24, and a cylindrical raw water inlet pipe section 62 configured to introduce raw water is formed in the uppermost portion thereof so as to protrude. An O-ring 63 is mounted on the outer periphery of the cylindrical raw water inlet pipe section 62. A peripheral wall 64 which is on the storing section 20 side with respect to the cylindrical raw water inlet pipe section 62 is molded to have a step in the shape substantially along the internal lid body 24, while being separated from the outer peripheral surface of the internal lid body 24. A pair of engagement protrusions 61 extending toward both outside in the radial direction is formed directly below the raw water inlet pipe section 62 on the outer periphery of the peripheral wall 64 molded to have a step.

In the external lid body 22, the lower opening 65 side is formed so as to be bent outward in the radial direction, and the bent formed portion is formed with an outer peripheral rib 66 slightly going around to the downside of the outer periphery of the upper end section 43 of the upper opening section 42 of the storing section 20. Furthermore, on the inside of the outer peripheral rib 66 in the radial direction, an inner peripheral rib 67 slightly protruding downward is formed. The upper end section 43 of the storing section 20 is interposed between the outer peripheral rib 66 and the inner peripheral rib 67, whereby the external lid body 22 is supported in the state of being positioned on the upper end section 43 of the storing section 20, and the external lid body 22 is fixed to the storing section 20 using ultrasonic welding or the like in this state.

Figure 4:
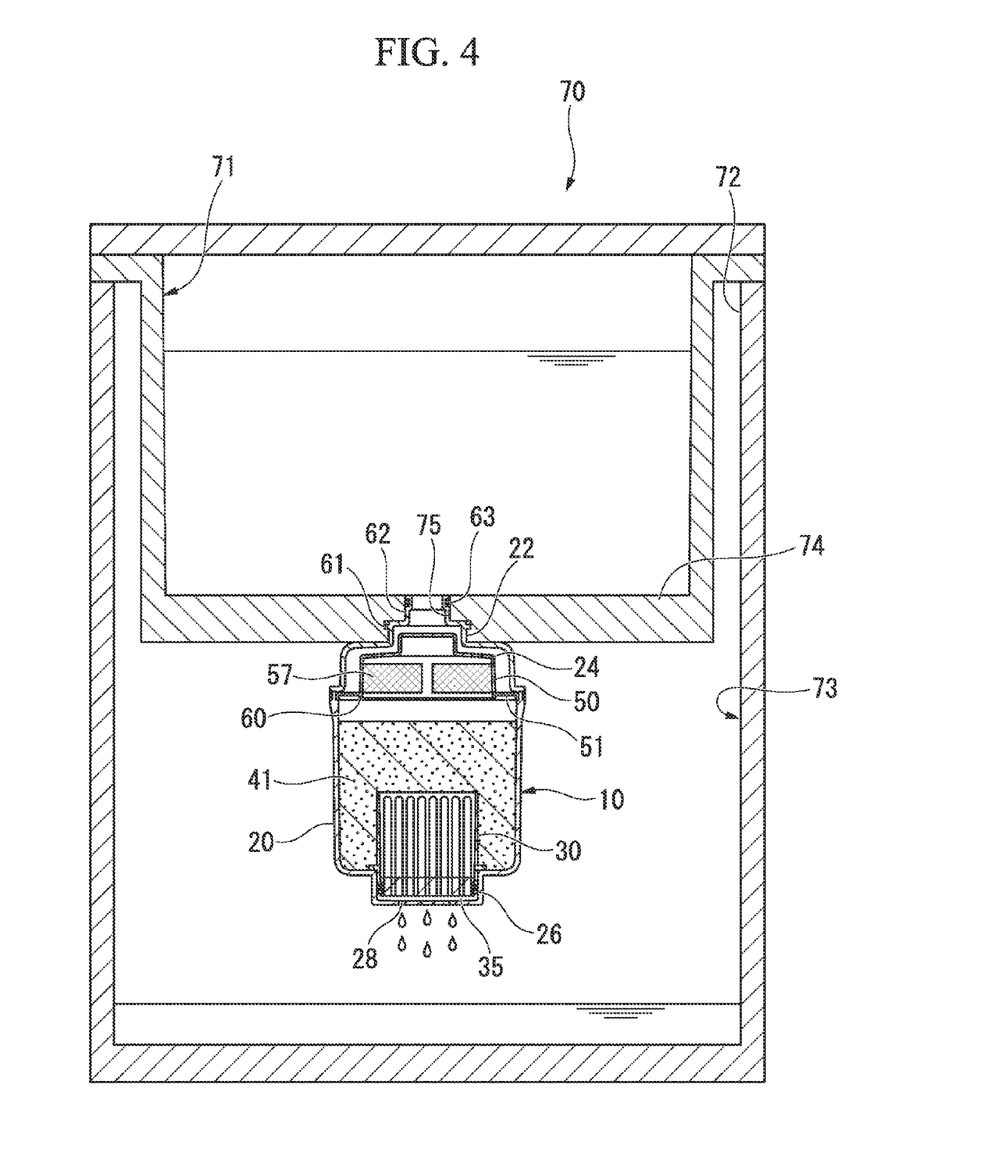
FIG. 4 is a longitudinal cross-sectional view of a water purifier having the water purification cartridge according to an embodiment of the present invention.

FIG. 4 shows a state where the above-mentioned water purification cartridge 10 is mounted on a self-weight type water purifier 70. The water purifier 70 includes an upper container 71 adapted to store raw water, and a lower container 73 adapted to support the upper container 71 by the upper opening section 72 and store purified water. The raw water inlet pipe section 62 of the external lid body 22 is fitted to an attachment port section 75 formed in the bottom wall 74 of the upper container 71 via the O-ring 63, and the water purification cartridge 10 is fixed to the bottom wall 74 of the upper container 71 by further rotating the engagement protrusion 61.

The water purification cartridge 10 of the present embodiment has the above-mentioned configuration. Next, the operation of a case of mounting the water purification cartridge 10 to the above-mentioned self-weight type filtration type water purifier 70 will be described.

First, when raw water is placed in the upper container 71 of the water purifier 70, the raw water flows into the water purification cartridge 10 from the raw water inlet pipe section 62 by gravitational force. The raw water is allowed to flow through the raw water inlet pipe section 62 flows down through a flow path formed between the external lid body 22 and the internal lid body 24 as far as the horizontal wall 51 of the internal lid body 24 by self-weight. Then, the raw water allowed to flow down as far as the horizontal wall 51 by self-weight moves inside of the extension direction side of the horizontal wall 51, and flows into the internal lid body 24 from the opening section 56 formed in the vertical wall 50 of the internal lid body 24 through the net 57. That is, the raw water flows inward in the radial direction from the outside in the radial direction of the water purification cartridge 10, and flows into the internal lid body 24. Thereafter, the raw water flowed into the internal lid body 24 flows down to the storing section 20.

The raw water flowed into the storing section 20 moves downward, while the adsorbent material adsorbs impurities or the like, reaches the membrane filtering unit 30, and then flows into the casing 38 of the membrane filtering unit 30.

In the casing 38 of the membrane filtering unit 30, the raw water pass from a primary side to a secondary side of the hollow fiber membrane 39 by hydraulic pressure generated due to self-weight, and at this time, the impurities or the like contained in water are captured by the hollow fiber membrane 39. Thereafter, water flowed down from the end portion of the hollow fiber membrane 39 is discharged as the purified water from the lower discharge port 28 of the storing section 20 via the gap 35, and is stored in the lower container 73.

Figure 7:
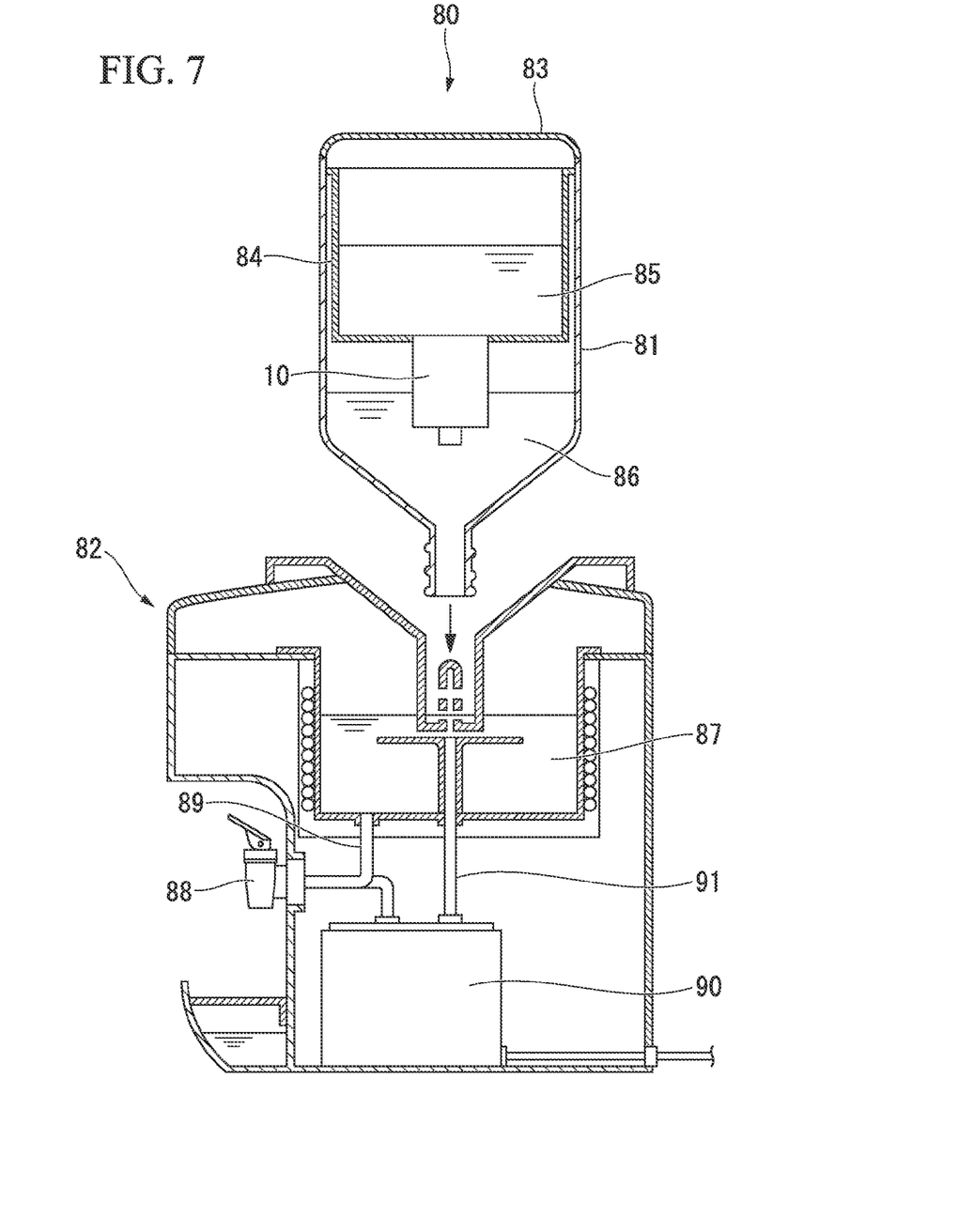
FIG. 7 is a longitudinal cross-sectional view of a water server having the water purification cartridge according to an embodiment of the present invention.

FIG. 7 shows a state where the above-mentioned water purification cartridge 10 is included in a main body container 81 in a self-weight type water server 80. The water server 80 includes a main body container 81 and a water server main body 82.

The main body container 81 has a lid 83, a reserve tank 84, the water purification cartridge 10, and a purified water storage section 86. The inner portion of the reserve tank 84 is a raw water storage section 85, and the water purification cartridge 10 is mounted on the bottom portion of the reserve tank 84.

The water server main body 82 has a cold water storage section 87 configured to store the purified water flowing from the purified water storage section 86 of the main body container 81 and provided with a cooler for cooling the purified water, a cold water discharge port 88, and a cold water passage 89 that connects the cold water storage section 87 with the cold water discharge port 88.

The water purification cartridge 10 of the present embodiment has the above-mentioned configuration, and is operated in the same manner as the above-mentioned water purifier 70. Specifically, when raw water enters the raw water storage section 85 of the reserve tank 84, the raw water flows into the water purification cartridge 10 by gravitational force. The raw water allowed to flow into the water purification cartridge 10 is operated in the same manner as in the embodiment of the water purifier 70, and the impurities or the like contained in the raw water are removed. The resulting water is discharged as the purified water, and are stored in the purified water storage section 86.

The purified water stored in the purified water storage section 86 flows down to the water server main body 82 and is stored in the cold water storage section 87. The purified water stored in the cold water storage section 87 is cooled by a cooler.

In the case where the purified water cooled by the cold water storage section 87 is used as a cold water, the purified water is allowed to flow out from the cold water discharge port 88 via the cold water passage 89 that connects the cold water storage section 87 with the cold water discharge port 88.

On the other hand, in the case where the purified water cooled by the cold water storage section 87 is used as a hot water, the purified water is allowed to flow into a hot water storage section 90 via a passage 91 that connects the cold water storage section 87 with the hot water storage section 90. The purified water stored in the hot water storage section 90 is heated by a heating unit (not shown) provided in hot water storage section 90. The heated purified water is allowed to flow out from a hot water discharge port (not shown) via a passage for hot water (not shown) that connects the hot water storage section 90 with the hot water discharge port.

According to the water purification cartridge 10 of these embodiments, the rib 60 is provided below the opening section 56 so as to protrude downward, and the lower edge of the net 57 partitioning the opening section 56 is fixed to the rib 60. Thus, for example, unlike in the case where the fixture fixing the lower edge of the net 57 is provided above the horizontal wall 51, the fixture does not become a dam when raw water flows into the opening section 56 along the extension direction of the horizontal wall 51. Accordingly, it is possible to prevent the raw water from being retained in the corner section 55 between the vertical wall 50 and the horizontal wall 51, while stably fixing the net 57 without being bent in the state along the opening section 56.

Furthermore, by partitioning the opening section 56 formed in the vertical wall 50 formed in a cylindrical shape by the net 57 and forming the rib 60 in a ring shape, the rib 60 is disposed over the entire lower position of the vertical wall 50 and the lower edge of the net 57 can be reliably fixed. Thus, the improvement of reliability can be promoted.

In addition, since the rib 60 is placed directly below the vertical wall 50, there is no need to bend the net 57 in any case of when providing the net 57 by performing insert-molding of the periphery of the net 57 in the vertical wall 50 of the periphery of the opening section 56 and the rib 60; and when forming the vertical wall 50 of the periphery of the opening section 56 and the rib 60, and then adhering the net 57 to provide the reticular texture. As a result, the attachment work becomes easy.

Moreover, when the above-mentioned rib 60 is applied to the water purification cartridge 10 for purifying the raw water by self-weight configured so that the raw water allowed to flow in from the raw water inlet pipe section 62 of the external lid body 22 flows down through the flow path between the external lid body 22 and the internal lid body 24, collides with the horizontal wall 51 of the internal lid body 24, and flows into the water purification cartridge 10 through the opening section 56 formed in the vertical wall 50, it is possible to prevent the raw water from being retained between the external lid body 22 and the internal lid body 24, and thus the inflow of the raw water to the water purification cartridge 10 can be facilitated.

In addition, although the case where the rib 60 is provided directly below the vertical wall 50 has been described in the above-mentioned embodiment, the present invention is not limited to such configuration. For example, as another embodiment, the net 57 may be placed so as to be offset to the outside in the radial direction with respect to the vertical wall 50 within the scope capable of attaching the net 57 without being bent. In this manner, it is possible to improve strength of the horizontal wall 51 near the corner section 55 by the fixing rib 60 of the net 57.

Furthermore, in the above-mentioned embodiment, explanation was given taking example of a case where a structure for the opening section in which the vertical wall 50 and the horizontal wall 51 are provided, the opening section 56 stands to the vertical wall 50 side from the corner section 55 and the rib 60 is provided below the vertical wall, is applied to the water purification cartridge 10. However, the structure can be applied to a component in which the opening section 56 starting up to the vertical wall 50 side from the corner section 55 between the vertical wall 50 and the horizontal wall 51 to allow a fluid to flow therethrough is provided in the vertical wall 50, other than the water purification cartridge 10.

INDUSTRIAL APPLICABILITY

The structure for the opening section of the present invention is able to stably fix the reticular texture, while preventing the fluid from being retained in the lower edge of the opening section, and is extremely useful as the opening section in the water purifier cartridge or the like. Furthermore, according to the water purification cartridge having the structure for the opening section of the present invention, raw water flowed in from the upper opening section of the external lid body flows down between the external lid body and the internal lid body, collides with the horizontal wall of the internal lid body, and enters inside the cartridge. Accordingly, in the particular case of the water purification cartridge adapted to purify the raw water by the self-weight, it is possible to prevent raw water from being retained between the external lid body and the internal lid body, and thus it is possible to allow the raw water to smoothly flow into the water purification cartridge.

DESCRIPTION OF REFERENCE SYMBOLS

10: water purification cartridge
22: external lid body
24: internal lid body
50: vertical wall
51: horizontal wall
55: corner section
56: opening section
57: net (reticular texture)
60: rib
62: raw water inlet pipe section (raw water inlet)

The invention claimed is:

1. An internal lid body for a water purification cartridge comprising:
    a vertical wall defining at least one opening;
    a horizontal wall connected to said vertical wall so as to form a corner section, wherein a lower edge of the at least one opening is defined by an upper surface of the horizontal wall;
    a downward protruding rib provided on a lower side of the horizontal wall below the corner section; and
    a net covering the at least one opening, wherein a lower edge of the net extends onto and is fixed to the rib.

2. The structure for an opening section according to claim 1, wherein the vertical wall is formed in a cylindrical shape, and the rib is formed in a ring shape.

3. The structure for an opening section according to claim 1, wherein the rib is placed directly below the vertical wall.

4. The structure for an opening section according to claim 2, wherein the rib is placed so as to be offset horizontally with respect to the vertical wall.

5. A water purification cartridge comprising:
    a housing having an open top and a bottom defining a plurality of discharge ports, wherein the housing contains an adsorbent material for purifying water;
    the internal lid body according to claim 1 fixed to the open top of the housing above the adsorbent material; and an external lid body fixed to the open top above the internal lid body, the external lid body having a raw water inlet configured to introduce raw water onto the inner lid body.

6. A water server comprising:

a main body container;

and a water server main body;

wherein the main body container has a lid, a raw water storage section configured to store water inside the main body container, the water purification cartridge according to claim 5, and a purified water storage section configured to store water purified within the water purification cartridge; and wherein the water server main body has a cold water storage section configured to store purified water flowing from the purified water storage section of the main body container and provided with a cooler which cools the purified water, a cold water discharge port configured to discharge cold water stored in the cold water storage section, and a cold water passage configured to connect the cold water storage section with the cold water discharge port.

7. The water server according to claim 6, wherein the main body water server has a hot water storage section provided with a heating unit which heats the cold water flowing from the cold water storage section, a passage configured to connect the cold water storage section with the hot water storage section, a hot water discharge port configured to discharge hot water stored in the hot water storage section, and a hot water passage configured to connect the hot water storage section with the hot water discharge port.

* * * * *